(12) United States Patent
Manhart

(10) Patent No.: US 9,702,093 B2
(45) Date of Patent: Jul. 11, 2017

(54) MATERIAL TRANSPORT CARRIAGE

(71) Applicant: SERSA MASCHINELLER GLEISBAU AG, Effretikon (CH)

(72) Inventor: Matthias Manhart, Winterberg (CH)

(73) Assignee: SERSA MASCHINELLER GLEISBAU AG, Effretikon (CH)

(*) Notice: Subject to any disclaimer, the term of this patent is extended or adjusted under 35 U.S.C. 154(b) by 0 days.

(21) Appl. No.: 14/915,462

(22) PCT Filed: Aug. 15, 2014

(86) PCT No.: PCT/EP2014/067507
§ 371 (c)(1),
(2) Date: Feb. 29, 2016

(87) PCT Pub. No.: WO2015/028321
PCT Pub. Date: Mar. 5, 2015

(65) Prior Publication Data
US 2016/0208443 A1    Jul. 21, 2016

(30) Foreign Application Priority Data

Sep. 2, 2013    (EP) .................................... 13182602

(51) Int. Cl.
*B65G 67/24*    (2006.01)
*B61D 15/00*    (2006.01)
(Continued)

(52) U.S. Cl.
CPC ............ *E01B 27/022* (2013.01); *B61D 15/00* (2013.01); *B61D 47/00* (2013.01); *B65G 37/00* (2013.01); *B65G 67/24* (2013.01); *E01B 27/00* (2013.01)

(58) Field of Classification Search
CPC ........... E01B 27/00; B61D 15/00; B61D 7/32; B65G 67/24
(Continued)

(56) References Cited

U.S. PATENT DOCUMENTS 2,275,799 A * 3/1942 Oklejas .................... B60P 1/38
414/520
2,410,996 A * 11/1946 Patterson .................. B60P 1/36
198/312
(Continued)

FOREIGN PATENT DOCUMENTS

DE    2 146 590 A1    3/1972
EP    0 419 423 A1    3/1991

OTHER PUBLICATIONS

International Preliminary Report on Patentability issued from the International Bureau in counterpart International Application No. PCT/EP2014/067507, issued on Mar. 8, 2016.
(Continued)

*Primary Examiner* — Douglas Hess
(74) *Attorney, Agent, or Firm* — Sughrue Mion, PLLC

(57) ABSTRACT

The invention relates to a material transport carriage (1) for transporting bulk material, in particular ballast. Said transport carriage comprises a frame (2) which extends in a longitudinal direction (L), expands in a transverse direction (Q) and spans a frame plane with an upper side and a lower side, in addition to at least two drive units (5) which are connected to the frame (2), and an upper conveyor unit (6) which is arranged on the upper side of the frame plane. Said material transport carriage (1) also comprises a lower conveyor unit (7) which is arranged on the underside of the frame plane (R).

33 Claims, 5 Drawing Sheets

(51) Int. Cl.
  *B61D 7/32* (2006.01)
  *E01B 27/00* (2006.01)
  *E01B 27/02* (2006.01)
  *B61D 47/00* (2006.01)
  *B65G 37/00* (2006.01)

(58) Field of Classification Search
  USPC .................. 198/312, 313, 314, 315, 317
  See application file for complete search history.

(56) References Cited

U.S. PATENT DOCUMENTS

| | | | | | |
|---|---|---|---|---|---|
| 3,599,785 | A * | 8/1971 | Stuart | ............... | A01K 1/01 198/314 |
| 4,178,237 | A * | 12/1979 | Theurer | ............ | E01B 29/24 104/307 |
| 4,711,403 | A * | 12/1987 | Gregory, Sr. | ...... | A01K 31/04 119/442 |
| 4,874,283 | A * | 10/1989 | Hurley, Jr. | ......... | E01C 23/06 239/675 |
| 5,360,097 | A * | 11/1994 | Hibbs | ............ | B65G 41/005 198/313 |
| 5,819,950 | A * | 10/1998 | McCloskey | ....... | B07B 1/005 198/313 |
| 6,113,339 | A * | 9/2000 | Adams | ............ | B60P 1/42 198/314 |
| 6,332,736 | B1 * | 12/2001 | Cape | ............ | B65G 41/008 198/312 |
| 6,698,594 | B2 * | 3/2004 | Cohen | ............ | B07B 1/005 209/421 |
| 7,264,104 | B2 * | 9/2007 | Heeszel | ............ | B02C 21/02 198/314 |
| 7,584,834 | B2 * | 9/2009 | Wood | ............ | B65G 37/00 198/312 |
| 7,726,904 | B2 * | 6/2010 | Looney | ............ | B60P 1/36 404/108 |
| 8,025,140 | B2 * | 9/2011 | Whyte | ............ | B02C 21/026 198/313 |
| 8,033,775 | B2 * | 10/2011 | Donelson | ............ | B60P 1/38 198/312 |
| 8,132,282 | B2 * | 3/2012 | Arsenault | ............ | E01H 1/042 15/83 |
| 8,573,917 | B2 * | 11/2013 | Renyer | ............ | A01C 15/003 414/523 |
| 9,271,472 | B2 * | 3/2016 | Clark | ............ | A01K 1/015 |

OTHER PUBLICATIONS

International Search Report of PCT/EP2014/067507 dated Oct. 22, 2014.

* cited by examiner

MATERIAL TRANSPORT CARRIAGE

TECHNICAL FIELD

The present invention relates to a material transport carriage for a track maintenance train according to the preamble of claim 1.

STATE OF THE ART

Material transport carriages for transporting bulk material (ballast, sand, gravel, soil, etc.) in the region of railway lines are known in the art. These material transport carriages typically comprise a frame, on the lower side of which are arranged the bogies with the wheels. On the upper side of the frame are arranged the components for the material transportation. These components typically comprise a conveyor belt which lies above the upper side of the frame and is pivotable about an axis at right angles to the upper side of the frame. The conveyor belt can be charged with bulk material by further facilities, wherein the bulk material is then unloaded alongside the railway carriage into a ballast bed that requires filling or into a railway carriage. This is referred to as a cross-loading.

Although very good results have been achieved in track maintenance trains with carriages of this kind, the cost of putting together these track maintenance trains is very high. The track maintenance train also frequently has to be converted or modified depending on use, something that is very costly and also not always possible in practice.

SUMMARY OF THE INVENTION

Based on the state of the art, it is an object of the invention to provide a material transport carriage which can be used in a more flexible manner.

This object is solved by the subject-matter according to claim 1. According to this, a material transport carriage for transporting bulk material, in particular ballast, comprises a frame which extends in a longitudinal direction and a transverse direction and spans a frame plane with an upper side and a lower side, at least two drive units which are in connection with the frame and an upper conveyor unit which is arranged on the upper side of the frame plane. The upper conveyor belt unit is therefore arranged on the upper side of the frame. The material transport carriage further comprises a lower conveyor unit which is arranged on the lower side of the frame plane. The lower conveyor unit is arranged on the lower side of the frame.

The arrangement of a conveyor unit on the upper side of the frame and a conveyor unit on the lower side of the frame means that a material transport carriage can be provided, which can be used in a very flexible manner. Depending on the position of the conveyor units, a various different working steps can be performed using the same material transport carriage. This increases flexibility. In particular, a complex conversion of individual carriages in a track maintenance train can be dispensed with. The efficiency of the track maintenance train can be increased.

Using the upper conveyor unit, bulk material can be reloaded onto a carriage standing to the side adjacent to the material transport carriage, for example, or an area adjacent to the line can be provided with bulk material. Using the lower conveyor unit, direct unloading into the carriage's own line or cross-loading into a line located to the side adjacent to the material transport carriage is possible.

The upper conveyor unit and the lower conveyor unit in this case are arranged on a common frame which forms the base of the material transport carriage. In other words, the two conveyor units are arranged on a common material transport carriage.

The drive units are bogies, for example.

The lower conveyor unit comprises at least one conveyor belt, preferably at least two, in particular precisely two conveyor belts. From a starting position, the conveyor belts are pivotable into a pivoted position relative to the frame about swivel axes which are angled, in particular perpendicular, to the frame plane.

The conveyor belts of the lower conveyor belt unit are preferably identical to one another in design.

The conveyor belts of the lower conveyor belt unit, in addition to the lower side of the frame plane, are pivotable. This means that the angle between the conveyor belts and the frame plane can be adjusted.

In their starting position, the conveyor belts of the lower conveyor belt unit preferably extend in the longitudinal direction and can then be pivoted about the said swivel axis, so that the conveyor belts are angled with respect to the longitudinal direction in the pivoted position. The conveyor belts are preferably pivotable by up to 90° relative to the longitudinal direction.

In a particularly preferred embodiment, a conveyor belt is arranged to the left of the frame and another conveyor belt to the right of the frame relative to the longitudinal direction in each case. Regions to the left and right of the material transport carriage can therefore be charged with bulk material simultaneously or selectively.

Particularly preferably, the conveyor belts of the lower conveyor unit are designed such that their length can be varied. The conveyor belts are therefore telescopic. The bulk material can therefore be unloaded particularly precisely. Alternatively, the unloading position of the bulk material can likewise be defined by the angle of the conveyor belts to the frame and by the traveling speed.

In the starting position, the conveyor belts preferably lie within the clearance gauge of the material transport carriage or the frame, when viewed in the longitudinal direction, and in the pivoted position the conveyor belts lie outside the clearance gauge. In the starting position, the conveyor belts do not therefore project beyond the clearance gauge, whereby safe transportation is made possible.

The material transport carriage preferably further comprises at least one silo unit. According to one embodiment, the silo unit comprises at least one delivery shaft, wherein the silo unit can be charged from the upper conveyor unit. The at least one delivery shaft opens out into areas below the frame, for example onto the lower conveyor unit and/or directly onto the line. In another embodiment, the silo unit comprises at least two delivery shafts arranged offset to one another when viewed in the longitudinal direction and it can be charged from the upper conveyor unit. One of the delivery shafts is directed at the lower conveyor unit and the other of the delivery shafts opens out directly into areas or onto the line below the frame. The line in this case is the line on which the material transport carriage is standing.

The delivery shafts preferably comprise at least one flap which can be closed and opened, so that the bulk material can be removed in dosed quantities.

Alternatively, the silo unit may also comprise only one delivery shaft which can be charged from the upper conveyor belt unit and is directed at the lower conveyor unit.

The silo unit preferably comprises a deflection element, in particular a flap, which conducts the bulk material into either one or other of the delivery shafts. By means of the deflection element, either the one or other of the delivery shafts can be charged with bulk material.

The frame preferably comprises a breakthrough through which the silo unit, in particular the delivery shafts, extend from the upper side of the frame through the frame or in which the silo unit opens out from the upper side of the frame. The breakthrough in this case projects through the frame from the upper side thereof to the lower side thereof.

The silo unit particularly preferably comprises a total of four delivery shafts which are offset in relation to one another in a longitudinal and transverse direction. Two delivery shafts lying at the same height in the longitudinal direction are directed at the lower conveyor belt unit which lies below the frame plane. Two further delivery shafts likewise lying at the same height in the longitudinal direction are directed at the line.

The upper conveyor belt unit preferably comprises a charging conveyor belt and at least one unloading conveyor belt, wherein the charging conveyor belt is displaceable along the longitudinal direction on the upper side of the frame and the delivery conveyor belt or the at least one silo unit can thereby be selectively charged.

The silo unit is preferably fixedly connected to the frame. The charging conveyor belt is displaceable relative to the frame and therefore to the silo unit, wherein the charging conveyor belt preferably lies at least partially above the silo unit and is movable away over the silo unit.

The funnel units preferably lie between the charging conveyor belt and the delivery conveyor belt.

Particularly preferably, the unloading conveyor belt can be pivoted into a pivoted position from a starting point about a swivel axis which is angled, in particular perpendicular, to the frame plane, wherein the unloading conveyor belt lies within the clearance gauge of the material transport carriage in the starting position, viewed in a longitudinal direction, and wherein the unloading conveyor belt lies outside the clearance gauge in the pivoted position.

The unloading conveyor belt preferably has a width of 1.8 to 2.2 meters, particularly preferably of 2 meters. The charging conveyor belt also preferably has a width in the said region.

The unloading conveyor belt can be pivoted clockwise and counter-clockwise about the said swivel axis, so that on the one hand it comes to rest on the left and on the other hand on the right of the material transport carriage. The unloading conveyor belt can preferably be pivoted about an angle of 90° relative to the starting position.

Both the charging conveyor belt and also the unloading conveyor belt are preferably tilted or angled in relation to the upper side or the frame plane, both in the starting position and also in the pivoted position. Particularly preferably, the inclination of the conveyor belt relative to the frame plane can be adjusted. This means that the charging conveyor belt and the unloading conveyor belt can be pivoted relative to the frame plane.

According to a method of operating a material transport carriage according to the above description, the lower conveyor belt unit is pivoted for cross-unloading from the starting position into the pivoted position, wherein the upper conveyor belt unit feeds the bulk material, possibly via the silo unit to the lower conveyor belt unit.

According to a method for operating a material transport carriage according to the above description, the upper conveyor belt unit is pivoted for cross-unloading from the starting position into the pivoted position, wherein the lower conveyor belt unit remains in the starting position.

According to a method for operating a material transport carriage according to the above description, the lower conveyor belt unit is pivoted for longitudinal unloading from the starting position into the pivoted position or remains in the starting position, wherein the upper conveyor belt unit feeds the bulk material, possibly via the silo unit to the lower conveyor belt unit.

According to a method for operating a material transport carriage according to the above description, the silo unit is charged using the upper conveyor belt unit and directed towards the line without contact with the lower conveyor belt unit. The line is therefore charged directly and without interaction with the lower conveyor belt unit.

Further embodiments are specified in the dependent claims.

BRIEF DESCRIPTION OF THE DRAWINGS

Preferred embodiments of the invention are described in the following with the help of the drawings, which only serve as an explanation and are not to be interpreted as limiting. In the drawings.

DESCRIPTION OF PREFERRED EMBODIMENTS

Figure 1:
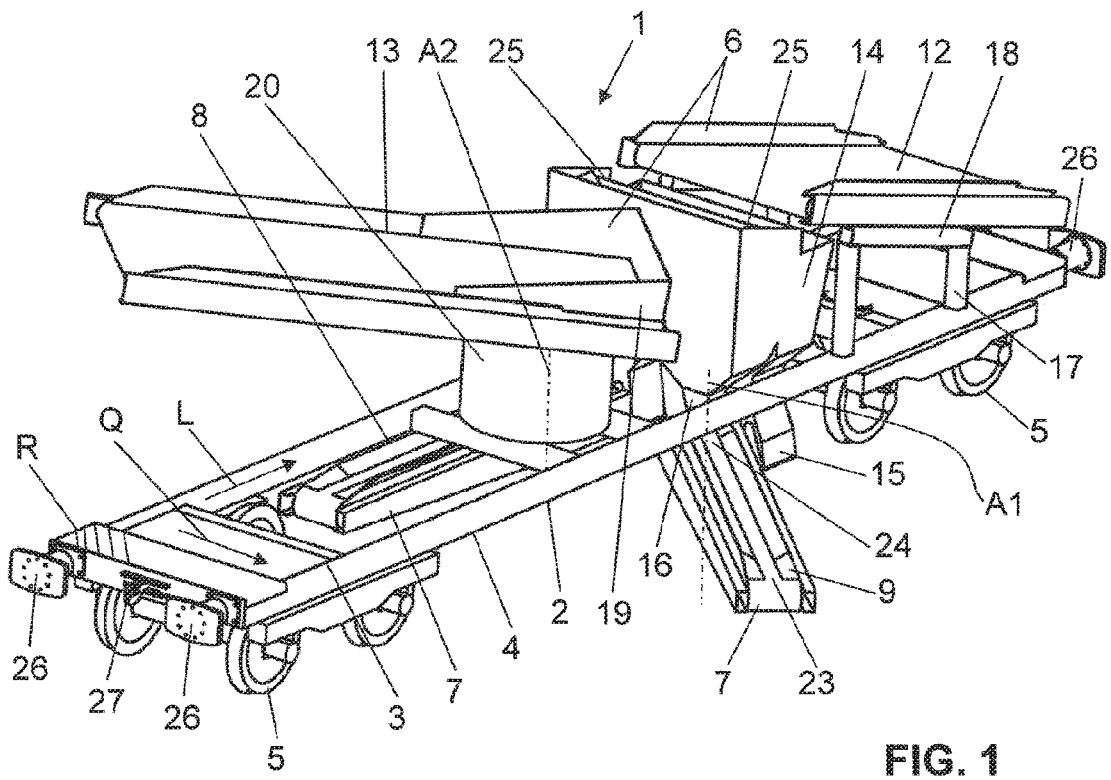
FIG. 1 shows a perspective view of an embodiment of the material transport carriage according to the invention.
Figure 2:
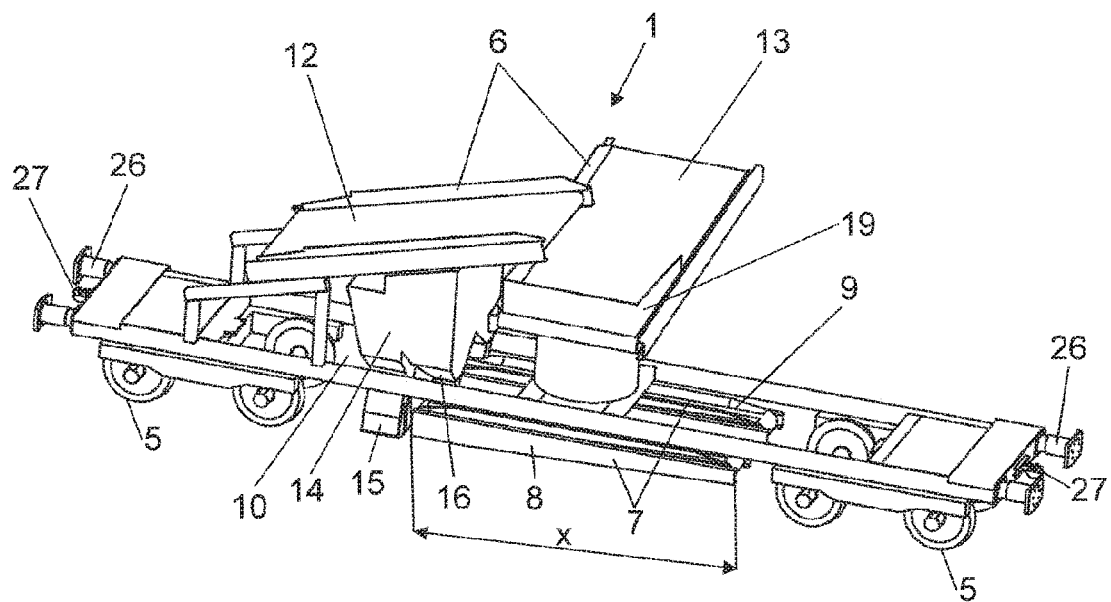
FIG. 2 shows a further perspective view of the material transport carriage according to FIG. 1.

FIGS. 1 and 2 show perspective views of a material transport carriage 1 for transporting bulk material, in particular ballast. Material transport carriages 1 of this kind are typically used in conjunction with other carriages in a track maintenance train. The track maintenance train is used to maintain or replace railway lines.

The material transport carriage 1 comprises a frame 2, at least two drive units 5 being in connection with the frame 2 and a further conveyor unit 6 which being in connection with the frame 2. The material transport carriage 1 further comprises a lower conveyor unit 7 which is likewise in connection with the frame 2.

The frame 2 extends in a longitudinal direction L and a transverse direction Q. The frame 2 spans a frame plane R which is represented as a symbol in FIG. 1. The frame plane R has an upper side 3 and a lower side 4. The upper side 3 in this case forms the upper side of the frame 2. The lower side 4 of the frame 2 is spaced apart from the frame plane R in this case. The frame plane R may also lie at a different height in the frame 2 relative to the frame 2 and is substantially introduced for the definition of the arrangement of the individual components on the frame 2. When the material transport carriage 1 is in use, the frame plane R or the frame 2 or the longitudinal direction L, respectively, and the transverse direction Q lie parallel to the ground, in particular to the tracks, where the material transport carriage 1 is standing or moving, respectively.

The upper conveyor unit 6 is arranged on the upper side of the frame plane R or on the upper side 3 of the frame 2. The lower conveyor unit 7 is arranged on the lower side of the frame plane R or on the lower side 4 of the frame 2. In other words, the upper conveyor unit 6 is arranged above the frame 2 and the lower conveyor unit 7 below the frame 2. During operation, work can be carried out optionally with either the upper conveyor unit 6 or the lower conveyor unit 7 or with the two combined.

In the present embodiment, the lower conveyor unit 7 comprises two conveyor belts 8, 9. In other embodiments, the conveyor unit 6 comprises at least one conveyor belt, preferably at least two conveyor belts 8, 9. From a starting position, the conveyor belts 8, 9 are pivotable into a pivoted position relative to the frame 2 about swivel axes A1 which are angled, in particular perpendicular, to the frame plane R. In FIG. 1 the conveyor belt 8 is situated in the starting position and the conveyor belt 9 in the pivoted position. In this case, a swivel axis is assigned to each of the conveyor belts 8, 9 of the second conveyor unit 6. Both in the starting position and also in the pivoted position, the conveyor belts 8, 9 can be used to distribute ballast, as is explained later on.

The conveyor belts 8, 9 are charged with bulk material and then transport said bulk material via a dropping edge 23 to the destination. The dropping edge 23 forms the front end of the corresponding conveyor belt 8, 9. Opposite the dropping edge 23, the conveyor belts 8, 9 are charged with the bulk material at a charging point 24.

The conveyor belts 8, 9 of the lower conveyor unit 7 are optionally pivotable relative to the lower side 4 of the frame plane R. In other words, the conveyor belts 8, 9 can be pivoted relative to the frame plane R, so that said conveyor belts 8, 9 are angled or inclined relative to the frame plane R.

Figure 3:
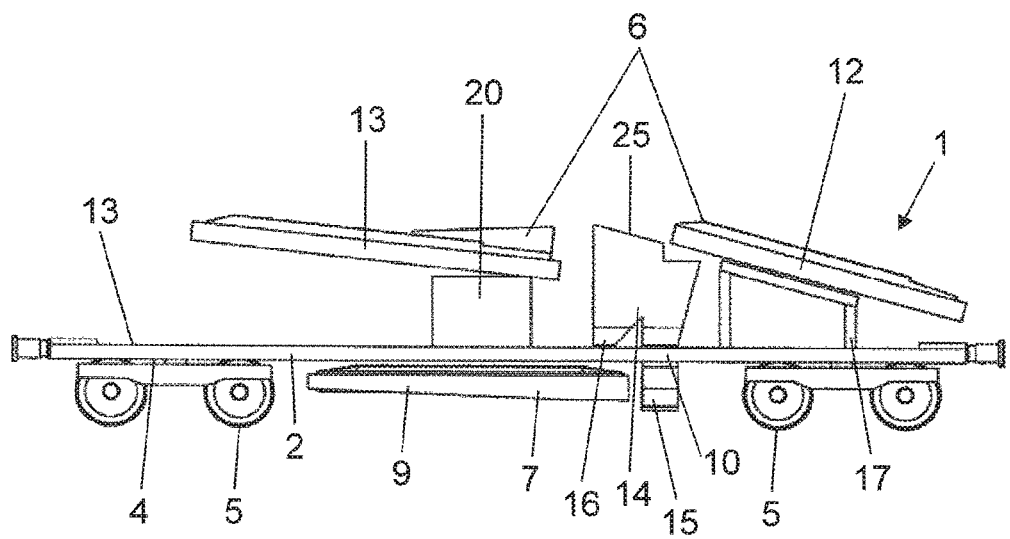
FIG. 3 shows a side view of the material transport carriage according to the preceding figures in the transport position.
Figure 4:
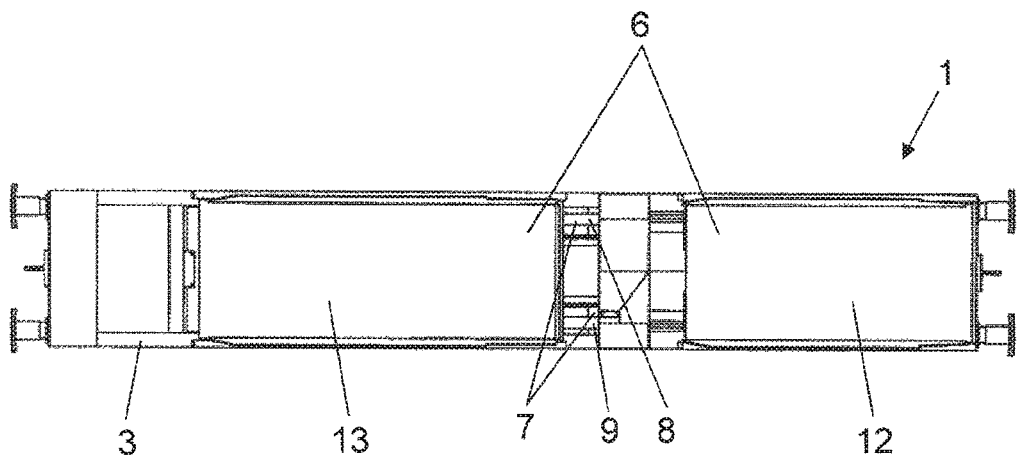
FIG. 4 shows a plan view of the material transport carriage according to FIG. 3.

In FIGS. 3 and 4 the conveyor belts 8, 9 of the second conveyor unit 7 are shown in their starting position. In the starting position, the conveyor belts 8, 9 extend in the longitudinal direction. The conveyor belts 8, 9 in this case are arranged in such a manner that in the starting position they do not extend beyond the clearance gauge of the material transport carriage 1 when viewed in the longitudinal direction L. If the material transport carriage 1 is transported in conjunction with the track maintenance train to a building site, the conveyor belts 8, 9 are located in the starting position. The clearance gauge is substantially defined by the extension of the material transport carriage 1 in the transverse direction Q.

In the particularly preferred embodiment, exactly two conveyor belts 8, 9 are arranged, wherein one conveyor belt 8 is arranged to the left on the frame 2 and another conveyor belt 9 to the right on the frame 2 in each case.

The conveyor belts 8, 9 of the lower conveyor unit 7 are preferably designed such that their length X can be varied. The conveyor belts 8, 9 are therefore telescopic.

The material transport carriage 1 further comprises at least one silo unit 14. The silo unit 14 in this case comprises two delivery shafts 15, 16 arranged offset to one another in the longitudinal direction L, via which delivery shafts the bulk material can be delivered, preferably selectively. The silo unit 14 may, however, also comprise only one or at least one delivery shaft.

The silo unit 14 can be charged from the upper conveyor unit 6. The upper conveyor unit 6 therefore feeds the bulk material to the silo unit 14. The bulk material gets into the silo unit 14 via an upper opening 25. The bulk material can then be correspondingly delivered from the silo unit 14 via the delivery shafts 15, 16. One of the two delivery shafts 16 in this case is directed at the lower conveyor unit 7. In other words, the conveyor belts 8, 9 of the second conveyor unit 7 lie below the delivery shaft 16, wherein these conveyor belts 8, 9 are charged with the bulk material via the delivery shaft 16. The other of the delivery shafts 15 opens out in the region below the frame 2 and is exposed, such that the bulk material can be fed via the delivery shaft 15 straight onto the line. The delivery shaft 15 is not therefore directed at the conveyor unit 7.

To control the bulk material within the silo unit 14, the silo unit 14 comprises at least one deflection element, in particular a flap, which conducts bulk material into either one or the other of the two delivery shafts 15, 16. Other means for allocating the bulk material may also be provided. Furthermore, it would also be possible for the silo unit 14 to be configured separately, so that the silo unit exhibits two different chambers, wherein the one chamber is assigned to one of the delivery shafts and the other chamber to the other of the delivery shafts, so that the bulk material can be assigned to the corresponding delivery shafts 14, 15 depending on the filling level.

The frame 2 has a breakthrough 10 in the region of the silo unit 14. The breakthrough 10 extends here over greater parts of the frame 2. Via this breakthrough 10, the bulk material from the silo unit can be brought from the upper side 3 of the frame, in other words from above the frame plane R, to the lower side 4 of the frame 2.

In the present embodiment, parts of the silo unit 14 extend through the frame 2. In particular, the two delivery shafts 15, 16 in this case extend from the upper side 3 of the frame 2 through the frame 2 and project as far as the lower side 4 of the frame 2, where the corresponding delivery points are then located.

In the embodiment shown here, the silo unit comprises a total of four delivery shafts 15, 16 which are offset to one another in the longitudinal direction L and in the transverse direction Q. Two of the delivery shafts, the delivery shafts with the reference number 15, are directed towards the line. Two more of the delivery shafts, in this case delivery shafts 16, are directed at the conveyor belts 8, 9 of the second conveyor unit 7.

The first conveyor unit 6 which is arranged on the upper side 3 of the frame 2 or on the upper side of the frame plane R of the frame 2, respectively, comprises a charging conveyor belt 12 and at least one unloading conveyor belt 13.

The charging conveyor belt 12 is used to charge different components of the material transport carriage 1. On the one hand, the charging conveyor belt 12 is used to charge the silo unit 14. On the other hand, the charging conveyor belt 12 is used to charge the unloading conveyor belt 13. The charging conveyor belt 12 in this case is displaceable along the longitudinal direction L as a whole relative to the fixed frame 2. In FIG. 1, the charging conveyor belt 12 is shown in such a manner that it charges the silo unit 14. In FIG. 2, the charging conveyor belt 12, viewed in the longitudinal direction L, is offset from the position in FIG. 1 and is positioned in such a way that the unloading conveyor belt 13 can be charged. During operation, the charging conveyor belt 12 is charged with corresponding bulk material from further machines such as, for example, an excavator or a silo truck.

The charging conveyor belt 12 is mounted on a carrier structure 17 in this case. By means of this carrier structure 17, the charging conveyor belt 12 can be displaced along the longitudinal direction. The carrier structure 17 in this case exhibits a guideway 18 which is oriented in an inclined manner relative to the frame plane R. By means of this guideway 18, the charging conveyor belt 12 is movably in connection with the carrier structure 17.

In general terms, the charging conveyor belt 12 can be displaced along the longitudinal direction L, so that optionally the unloading conveyor belt 13 or the at least one silo unit 14 and therefore the second conveyor belt unit 7 or the line, respectively, can be charged with the bulk material.

The silo unit 14 is substantially fixedly in connection with the frame 2. The charging conveyor belt 12 itself is displaceable relative to the frame 2 and therefore also to the silo unit 14, wherein the charging conveyor belt 12 lies at least partially above the silo unit 14 and is movable over the silo unit 14. The charging conveyor belt 12 therefore lies in the region of the silo unit 14 above the same. In the rear region, so outside the silo unit 14, the charging conveyor belt may also lie below the silo unit 14, as is depicted accordingly in FIG. 1.

The silo unit 14 lies between the charging conveyor belt 12 and the unloading conveyor belt 13.

The unloading conveyor belt 13 can be pivoted from a starting position into a pivoted position. For this purpose, the unloading conveyor belt 13 can be pivoted into a pivoted position about a swivel axis A2 which is angled, in particular perpendicular, to the frame plane R. In FIGS. 1 and 2, the unloading conveyor belt 13 is located in the pivoted position. In the starting position, the unloading conveyor belt 13 lies within the clearance gauge of the material transport carriage in the longitudinal direction L. The unloading conveyor belt 13, on the other hand, extends in the pivoted position outside the clearance gauge of the material transport carriage 1. The clearance gauge is substantially defined by the extension of the material transport carriage 1 in the transverse direction Q.

The charging conveyor belt 12 and the unloading conveyor belt 13 are inclined or angled to the frame plane R, both in the starting position and also in the pivoted position. The unloading conveyor belt 13 has a retaining wall 19 in its rear portion, where the bulk material encounters the unloading conveyor belt 13, which wall prevents the bulk material from being able to fall backwards against the silo unit 14.

The unloading conveyor belt 13 is in connection with the frame 2, in particular with the upper side 3 of the frame 2, by a swivel joint 20. The swivel joint 20 in this case is mounted accordingly on the upper side 3 of the frame 2.

On the front side, the frame 2 comprises buffers 26 and couplings 27, so that the material transport carriage 1 can be connected to other railway carriages or a locomotive.

In FIGS. 3 and 4, the material transport carriage 1 according to the invention is shown in the transport position. The first conveyor belt unit 6 and the second conveyor belt unit 7 in this case lie in such a manner that they are within the clearance gauge and do not extend beyond the clearance gauge of the material transport carriage 1. This applies in particular in relation to the transverse direction Q. The conveyor belt 8 and the conveyor belt 9 preferably lie parallel to one another and substantially parallel to the frame 2 in relation to the transverse direction Q. The unloading conveyor belt 13 is also directed at the frame 2 in the longitudinal direction L and does not extend beyond the clearance gauge relative to the transverse direction when viewed in the longitudinal direction L. In the position shown in FIGS. 3 and 4, the material transport carriage 1 can be transported in a track maintenance train to a building site.

Figure 5:
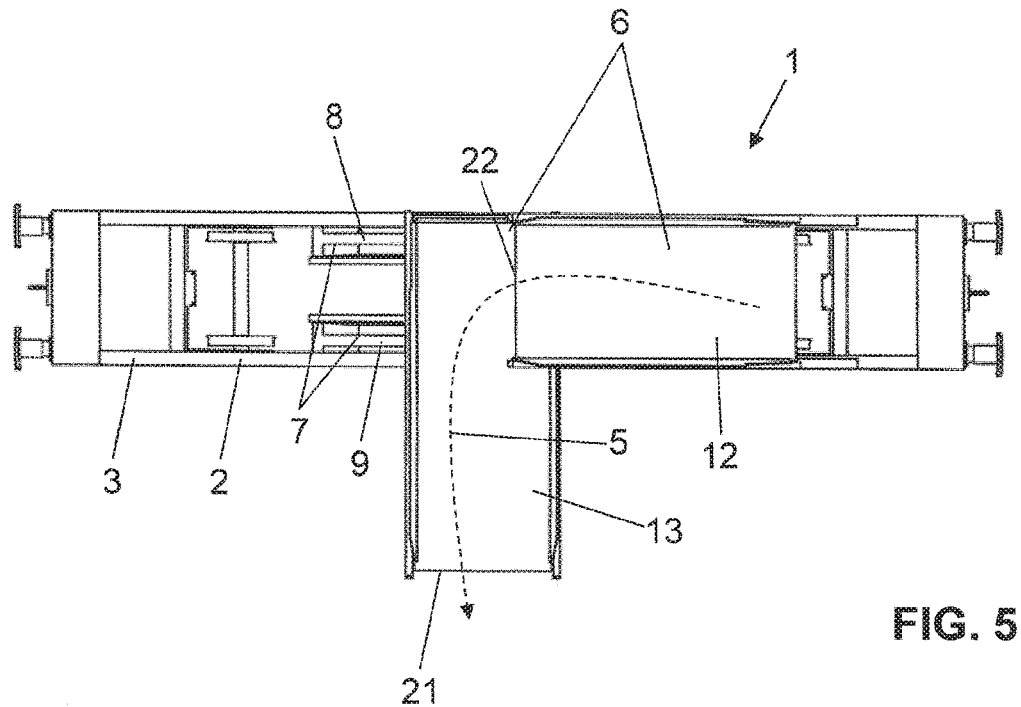
FIG. 5 shows a side view of the material transport carriage according to the preceding figures in the upper cross-unloading position.
Figure 6:
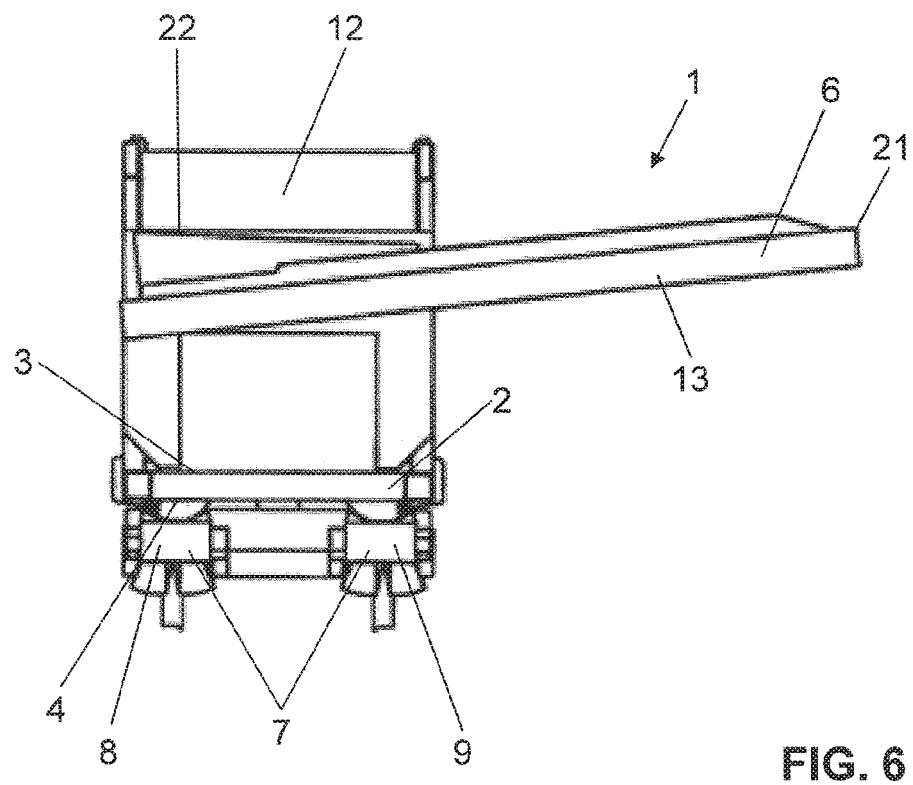
FIG. 6 shows a plan view of the material transport carriage according to FIG. 5.

The material transport carriage is shown in a first configuration in FIGS. 5 and 6. This involves the possibility of the cross-unloading of bulk material via the unloading conveyor belt 13. The unloading conveyor belt 13 in this case is angled, in particular perpendicular, to the longitudinal direction L and projects beyond the clearance gauge in relation to the transverse direction Q beyond the frame 2. The charging conveyor belt 12 is further pushed forward so far in the direction of the unloading conveyor belt 13 that the bulk material reaches the unloading conveyor belt 13 from the charging conveyor belt 12. In the region of the delivery point, the unloading conveyor belt 13 lies below the charging conveyor belt 12 in this case. The bulk material then passes from the charging conveyor belt 12 along the arrow direction S to the unloading conveyor belt 13, where the bulk material is deflected about the angle of the unloading conveyor belt 13, so substantially about 90°. The bulk material S is transported on from the unloading conveyor belt 13 and finally reaches the dropping edge 21 of the unloading conveyor belt 13. The bulk material leaves the unloading conveyor belt 13 at this point in the region of the dropping edge 21. The dropping edge 22 of the charging conveyor belt 12 lies in the region of the unloading conveyor belt 13 in this case, as already mentioned above. With the configuration shown in FIGS. 5 and 6, the bulk material can therefore be unloaded transversely to the longitudinal direction L. This configuration is used, for example, when the bulk material has to be loaded onto a carriage on an adjacent track or when the bulk material is to be transported on a line which lies adjacent to the line on which the material transport carriage 1 is standing.

Figure 7:
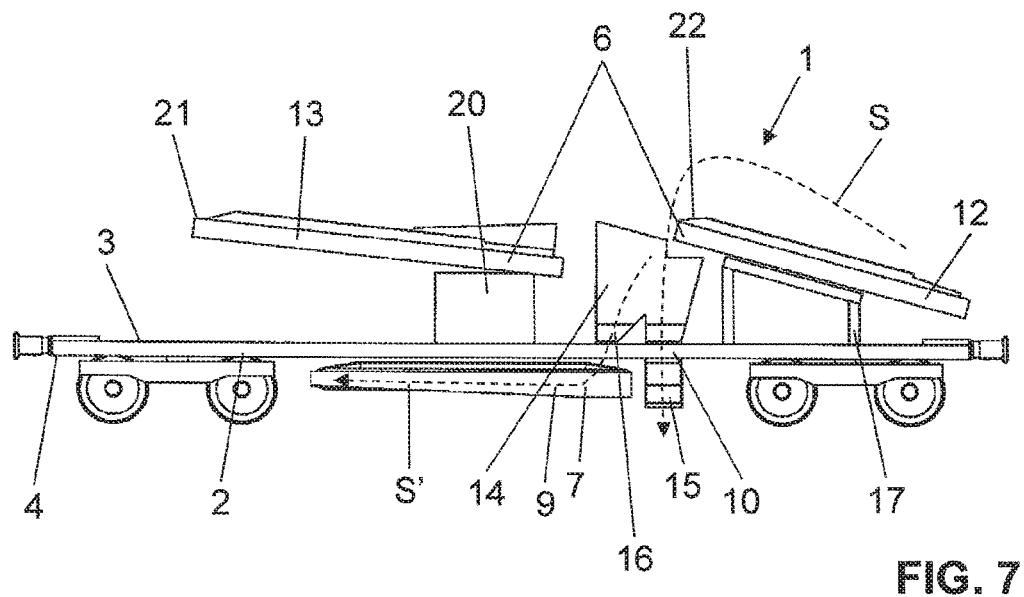
FIG. 7 shows a side view of the material transport carriage according to the preceding figures in the pivoted position.
Figure 8:
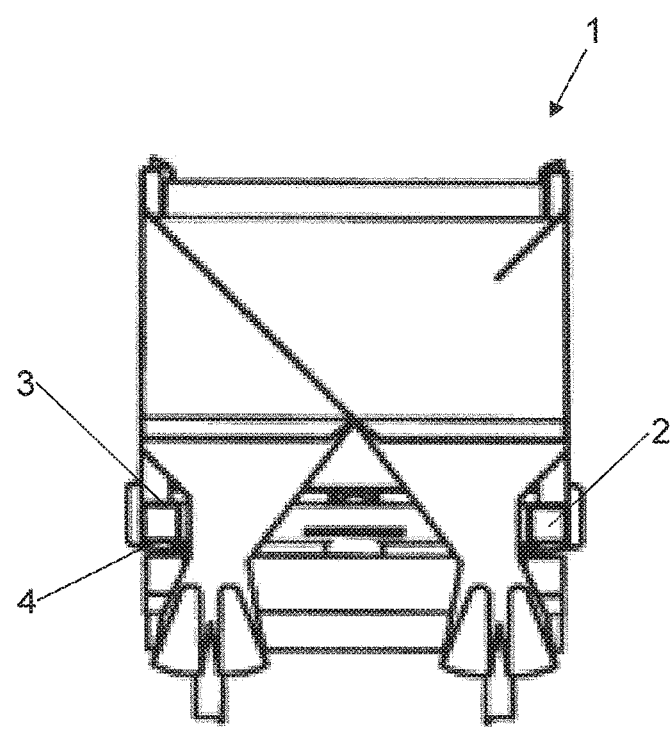
FIG. 8 shows a plan view of the material transport carriage according to FIG. 7.

FIGS. 7 and 8 show the unloading of the bulk material onto the line via the silo unit 14. The charging conveyor belt 12 is positioned in such a manner that the dropping edge 22 is above the silo unit 14. The unloading conveyor belt 13 and the conveyor belts 8, 9 of the second conveyor belt unit 7 are in the starting position in this case. The bulk material is now fed via the charging conveyor belt 12 to the silo unit 14. In the silo unit 14, corresponding slides or flaps are set in such a manner that the bulk material is fed via the delivery shaft 16. The line on which the material transport carriage 1 stands is then directly filled with the bulk material via the delivery shaft 15, which is exposed. The arrow S again shows the path of the bulk material in this configuration.

Alternatively, however, the silo unit 14 may also be set in such a manner that the bulk material reaches the conveyor belts 8, 9 in the starting position, wherein the bulk material is then transported by the conveyor belts 8, 9 in the longitudinal direction L. This is depicted by the arrow S'.

Figure 9:
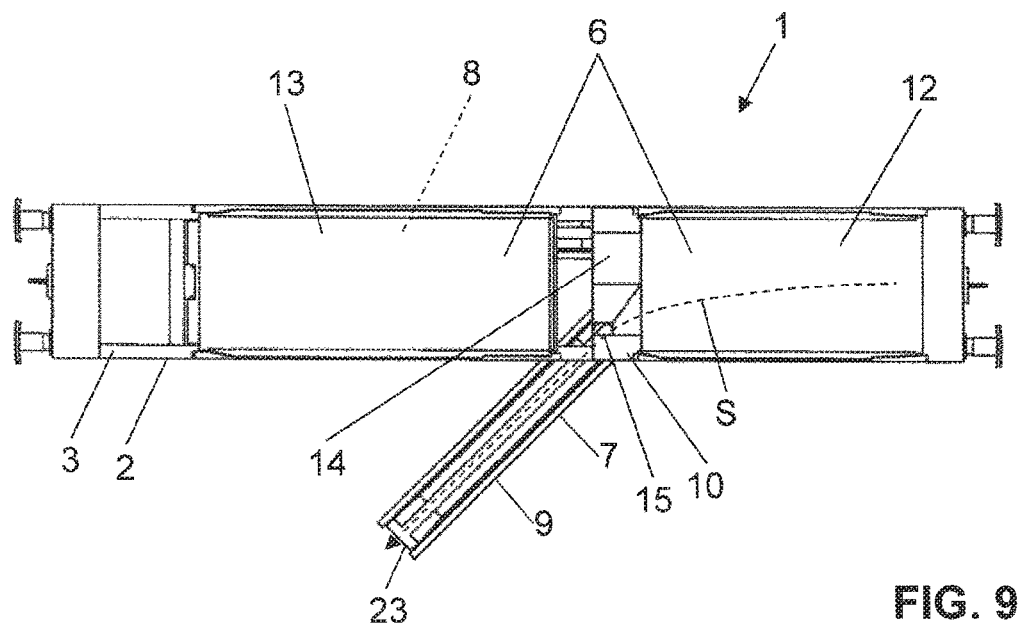
FIG. 9 shows a side view of the material transport carriage according to the preceding figures in the pivoted position and FIG. 10 shows a plan view of the material transport carriage according to FIG. 9.
Figure 10:
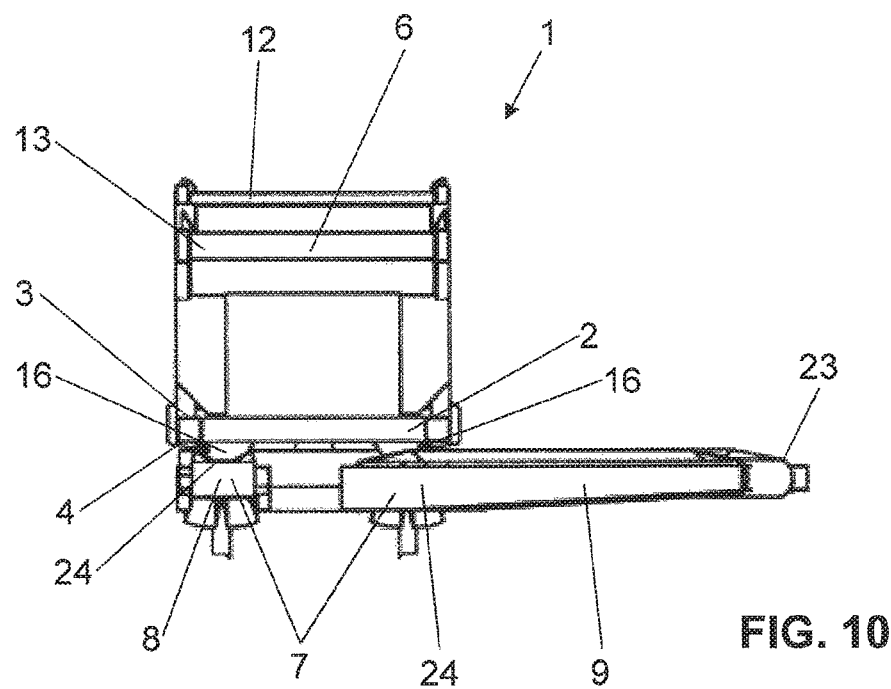

FIGS. 9 and 10 show a further possible configuration of the material transport carriage 1. In this case, one of the two conveyor belts 8, 9 of the second conveyor belt unit 7 is swiveled out laterally and lies in a pivoted position. This is the conveyor belt 9. The conveyor belt 8 is located in the starting position. The charging conveyor belt 12 or the silo unit, respectively, are set in such a manner that the bulk material can be fed to the conveyor belt 9 via the delivery shaft 15. Corresponding slides which are not shown in the figures are used to ensure that the bulk material only reaches the conveyor belt 8 and not the conveyor belt 9. In a further configuration of this cross-unloading, it is also conceivable for both conveyor belts 8, 9 to be swiveled out accordingly and for the bulk material S to be unloaded into a line adjacent to the line on which the material transport carriage 1 is standing.

| LIST OF REFERENCE NUMBERS | | | |
|---|---|---|---|
| 1 | Material transport carriage | A1 | Swivel axis |
|   |   | A2 | Swivel axis |
| 2 | Frame | | |
| 3 | Upper side | | |
| 4 | Lower side | L | Longitudinal direction |
| 5 | Drive units | | |
| 6 | Upper conveyor unit | Q | Transverse direction |
| 7 | Lower conveyor unit | | |
| 8 | Conveyor belt | X | Length |
| 9 | Conveyor belt | R | Frame plane |
| 10 | Breakthrough | | |
| 12 | Charging conveyor belt | | |
| 13 | Unloading conveyor belt | A1 | Swivel axis |
| 14 | Silo unit | A2 | Axis |
| 15 | Delivery shaft | | |
| 16 | Delivery shaft | | |
| 17 | Carrier structure | | |
| 18 | Guide rail | | |
| 19 | Retaining wall | | |
| 20 | Swivel joint | | |
| 21 | Dropping edge | | |
| 22 | Dropping edge | | |
| 23 | Dropping edge | | |
| 24 | Charging point | | |
| 25 | Upper opening | | |
| 26 | Buffer | | |
| 27 | Couplings | | |

The invention claimed is:

1. A material transport carriage for transporting bulk material, in particular ballast, comprising:
a frame, which frame extends in a longitudinal direction and a transverse direction and spans a frame plane with an upper side and a lower side,
at least two drive units which are in connection with the frame, and
an upper conveyor unit which is arranged on the upper side of the frame plane,
wherein the material transport carriage further comprises a lower conveyor unit which is arranged on the lower side of the frame plane, and
wherein the material transport carriage further comprises at least one silo unit which comprises at least one delivery shaft, wherein the at least one silo unit can be charged from the upper conveyor unit.

2. The material transport carriage as claimed in claim 1, wherein the lower conveyor unit comprises at least one conveyor belt, preferably at least two, in particular precisely two, conveyor belts which from a starting position are pivotable into a pivoted position relative to the frame about swivel axes which are angled, in particular perpendicular, to the frame plane.

3. The material transport carriage as claimed in claim 2, wherein the conveyor belts of the lower conveyor belt unit, in addition to the lower side of the frame plane are pivotable.

4. The material transport carriage as claimed in claim 2, wherein
in their starting position, the conveyor belts of the lower conveyor belt unit extend in the longitudinal direction and can be pivoted about the said swivel axis, so that the conveyor belts are angled to the longitudinal direction in the pivoted position; and/or
wherein in relation to the longitudinal direction, a conveyor belt is arranged to the left on the frame and another conveyor belt to the right on the frame; and/or
wherein the conveyor belts of the lower conveyor unit are designed such that their length can be varied.

5. The material transport carriage as claimed in claim 2, wherein in the starting position, the at least one conveyor belt lie within a clearance gauge of the material transport carriage or the frame, when viewed in the longitudinal direction, and that in the pivoted position the conveyor belts lie outside the clearance gauge.

6. The material transport carriage as claimed in claim 1, wherein the at least one silo unit comprises at least two delivery shafts arranged offset when viewed in the longitudinal direction, wherein one of the delivery shafts is directed at the lower conveyor unit and wherein the other of the delivery shafts opens out directly into areas or onto the line below the frame.

7. The material transport carriage as claimed in claim 6, wherein the at least one silo unit comprises a deflection element, in particular a flap, which conducts the bulk material into either one or other of the delivery shafts.

8. The material transport carriage as claimed in claim 6, wherein the frame comprises a breakthrough through which the at least one silo unit, in particular the delivery shafts, extend from the upper side of the frame through the frame or in which the at least one silo unit opens out from the upper side of the frame.

9. The material transport carriage as claimed in claim 6, wherein the at least one silo unit comprises a total of four delivery shafts which are offset in relation to one another in a longitudinal direction and transverse direction.

10. The material transport carriage as claimed in claim 1, wherein the upper conveyor belt unit comprises a charging conveyor belt and at least one unloading conveyor belt, wherein the charging conveyor belt is displaceable along the longitudinal direction and the unloading conveyor belt or the at least one silo unit can thereby be selectively charged.

11. The material transport carriage as claimed in claim 10, wherein the at least one silo unit is fixedly in connection with the frame and that the charging conveyor belt is displaceable relative to the frame, wherein the charging conveyor belt preferably lies at least partially above the at least one silo unit and is movable away over the at least one silo unit.

12. The material transport carriage as claimed in claim 10, wherein the at least one silo unit lies between the charging conveyor belt and the unloading conveyor belt.

13. The material transport carriage as claimed in claim 10, wherein the unloading conveyor belt is pivotable from a starting position into a pivoted position about a swivel axis which is angled, in particular perpendicular, to the frame plane, wherein the unloading conveyor belt lies within a clearance gauge of the material transport carriage in the starting position, viewed in a longitudinal direction, and wherein the unloading conveyor belt lies outside the clearance gauge in the pivoted position.

14. The material transport carriage as claimed claim 10, wherein the charging conveyor belt and the unloading conveyor belt are inclined to the frame plane, both in the starting position and also in the pivoted position.

15. The material transport carriage as claimed in claim 10, wherein the unloading conveyor belt is pivotable relative to the frame plane.

16. A method of operating a material transport carriage as claimed in claim 1, wherein
the lower conveyor belt unit, in particular at least one of the conveyor belts of the same, is pivoted for cross-unloading from the starting position into the pivoted position, wherein the upper conveyor belt unit feeds the bulk material to the lower conveyor belt unit, or wherein the upper conveyor belt unit is pivoted for cross-unloading from the starting position into the pivoted position, wherein the lower conveyor belt unit remains in the starting position, or wherein the lower conveyor belt unit is pivoted for longitudinal unloading from the starting position into the pivoted position or remains in the starting position, wherein the upper conveyor belt unit feeds the bulk material to the lower conveyor belt unit, wherein the at least one silo unit is charged using the upper conveyor belt unit and directed towards the line without contact with the lower conveyor belt unit.

17. The method as claimed in claim 16, wherein the upper conveyor belt unit feeds the bulk material via the at least one silo unit to the lower conveyor belt unit.

18. A material transport carriage for transporting bulk material such as ballast comprising:
a frame, which frame extends in a longitudinal direction and a transverse direction and spans a frame plane with an upper side and a lower side,
at least two drive units which are in connection with the frame, and
an upper conveyor unit which is arranged on the upper side of the frame plane,
wherein the material transport carriage further comprises a lower conveyor unit which is arranged on the lower side of the frame plane,
wherein the material transport carriage further comprises at least one silo unit which comprises at least one delivery shaft, and
wherein the upper conveyor unit comprises a charging conveyor belt and at least one unloading conveyor belt, wherein the charging conveyor belt is displaceable along the longitudinal direction such that the unloading conveyor belt or the at least one silo unit can thereby be selectively charged.

19. The material transport carriage as claimed in claim 18, wherein the lower conveyor unit comprises at least one conveyor belt or at least two conveyor belts or precisely two conveyor belts which from a starting position are pivotable into a pivoted position relative to the frame about swivel axes which are angled to the frame plane.

20. The material transport carriage as claimed in claim 19, wherein
in the starting position, the conveyor belts of the lower conveyor unit extend in the longitudinal direction and can be pivoted about said swivel axes, so that the conveyor belts of the lower conveyor unit are angled to the longitudinal direction in the pivoted position; and/or
wherein in relation to the longitudinal direction, a conveyor belt is arranged to the left on the frame and another conveyor belt to the right on the frame; and/or
wherein the conveyor belts of the lower conveyor unit have a length that can be varied.

21. The material transport carriage as claimed in claim 19, wherein in the starting position, the conveyor belts of the lower conveyor unit lie within a clearance gauge of the material transport carriage or the frame, when viewed in the longitudinal direction, and in the pivoted position the conveyor belts of the lower conveyor unit lie outside the clearance gauge.

22. A method of operating a material transport carriage as claimed in claim 19, wherein at least one of the conveyor belts of the lower conveyor unit is pivoted for cross-unloading from the starting position into the pivoted position, wherein the upper conveyor unit feeds the bulk material to the lower conveyor unit, or wherein the upper conveyor unit is pivoted for cross-unloading from the starting position into the pivoted position, wherein the lower conveyor unit remains in the starting position, or wherein the lower conveyor unit is pivoted for longitudinal unloading from the starting position into the pivoted position or remains in the starting position, wherein the upper conveyor unit feeds the bulk material to the lower conveyor unit, wherein the silo unit is charged using the upper conveyor unit and directed towards a line below the frame without contact with the lower conveyor unit.

23. The method as claimed in claim 22, wherein the upper conveyor unit feeds the bulk material via the silo unit to the lower conveyor unit.

24. The material transport carriage as claimed in claim 18, wherein the conveyor belts of the lower conveyor unit, in addition to the lower side of the frame plane, are pivotable.

25. The material transport carriage as claimed in claim 18, wherein the at least one silo unit, wherein the at least one silo unit can be charged from the upper conveyor unit via the delivery shaft, or
wherein the at least one silo unit comprises at least two delivery shafts arranged offset when viewed in the longitudinal direction, wherein the at least one silo unit can be charged from the upper conveyor unit and wherein one of the delivery shafts is directed at the lower conveyor unit and the other of the delivery shafts opens out directly into areas or onto a line below the frame.

26. The material transport carriage as claimed in claim 25, wherein the silo unit comprises a deflection element which conducts the bulk material into either one or another of the delivery shafts.

27. The material transport carriage as claimed in claim 25, wherein the frame comprises a breakthrough through which the at least one silo unit delivery shafts extend from the upper side of the frame through the frame or in which the at least one silo unit opens out from the upper side of the frame.

28. The material transport carriage as claimed in claim 25, wherein the silo unit comprises a total of four delivery shafts which are offset in relation to one another in a longitudinal direction and a transverse direction.

29. The material transport carriage as claimed in claim 28, wherein the silo unit is fixedly connected to the frame and the charging conveyor belt is displaceable relative to the frame, and wherein the charging conveyor belt lies at least partially above the silo unit and is movable away over the silo unit.

30. The material transport carriage as claimed in one of claim 28, wherein the silo unit lies between the charging conveyor belt and the unloading conveyor belt.

31. The material transport carriage as claimed in claim 30, wherein the unloading conveyor belt is pivotable from a starting position into a pivoted position about a swivel axis which is angled to the frame plane, wherein the unloading conveyor belt lies within a clearance gauge of the material transport carriage in the starting position, viewed in a longitudinal direction, and wherein the unloading conveyor belt lies outside the clearance gauge in the pivoted position.

32. The material transport carriage as claimed claim 31, wherein the charging conveyor belt and the unloading conveyor belt are inclined to the frame plane, both in the starting position and also in the pivoted position.

33. The material transport carriage as claimed in claim 30, wherein the unloading conveyor belt is pivotable relative to the frame plane.

\* \* \* \* \*